United States Patent
Hsu et al.

(10) Patent No.: US 9,984,153 B2
(45) Date of Patent: May 29, 2018

(54) ELECTRONIC DEVICE AND MUSIC PLAY SYSTEM AND METHOD

(71) Applicant: Chiun Mai Communication Systems, Inc., New Taipei (TW)

(72) Inventors: Chih-Pu Hsu, New Taipei (TW); Hsiu-Hua Yen, New Taipei (TW); Sung-Jay Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days. days.

(21) Appl. No.: 15/252,657

(22) Filed: Aug. 31, 2016

(65) Prior Publication Data

US 2017/0161381 A1    Jun. 8, 2017

(30) Foreign Application Priority Data

Dec. 4, 2015 (CN) .......................... 2015 1 0878640

(51) Int. Cl.
*G06F 17/00* (2006.01)
*G06F 17/30* (2006.01)
*G06F 3/16* (2006.01)

(52) U.S. Cl.
CPC .......... *G06F 17/30772* (2013.01); *G06F 3/16* (2013.01); *G06F 17/30743* (2013.01); *G06F 17/30752* (2013.01)

(58) Field of Classification Search
CPC ...................................................... G06F 3/165
See application file for complete search history.

(56) References Cited

U.S. PATENT DOCUMENTS

2011/0295843 A1* 12/2011 Ingrassia, Jr. ..... G06F 17/30053
707/723
2014/0281976 A1* 9/2014 Chia ................. G06F 17/30873
715/716

FOREIGN PATENT DOCUMENTS

| CN | 101890215 A | 11/2010 |
|----|-------------|---------|
| CN | 101120343 B | 7/2012  |
| CN | 104822103 A | 8/2015  |

\* cited by examiner

*Primary Examiner* — Joseph Saunders, Jr.
(74) *Attorney, Agent, or Firm* — ScienBiziP, P.C.

(57) ABSTRACT

A music play method includes detecting at least one group of dynamic parameters of an electronic device and obtaining detected dynamic parameters. Once a music playlist of the electronic device is determined to be adjusted according to the detected dynamic parameters, the music play is adjusted according to the detected dynamic parameters and an adjusted music playlist is obtained.

30 Claims, 7 Drawing Sheets

ELECTRONIC DEVICE AND MUSIC PLAY SYSTEM AND METHOD

CROSS-REFERENCE TO RELATED APPLICATIONS

This application claims priority to Chinese Patent Application No. 201510878640.7 filed on Dec. 4, 2015, the contents of which are incorporated by reference herein. This application is related to a commonly-assigned application entitled, "SERVER AND MUSIC SERVICE PROVIDING SYSTEM AND METHOD", filed Aug. 31, 2016 Ser. No. 15/252,627.

FIELD

The subject matter herein generally relates to data processing technology, and particularly to an electronic device and a music play system and method.

BACKGROUND

Electronic devices are used to process information. For example, the electronic device can be used to play a music for a user.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
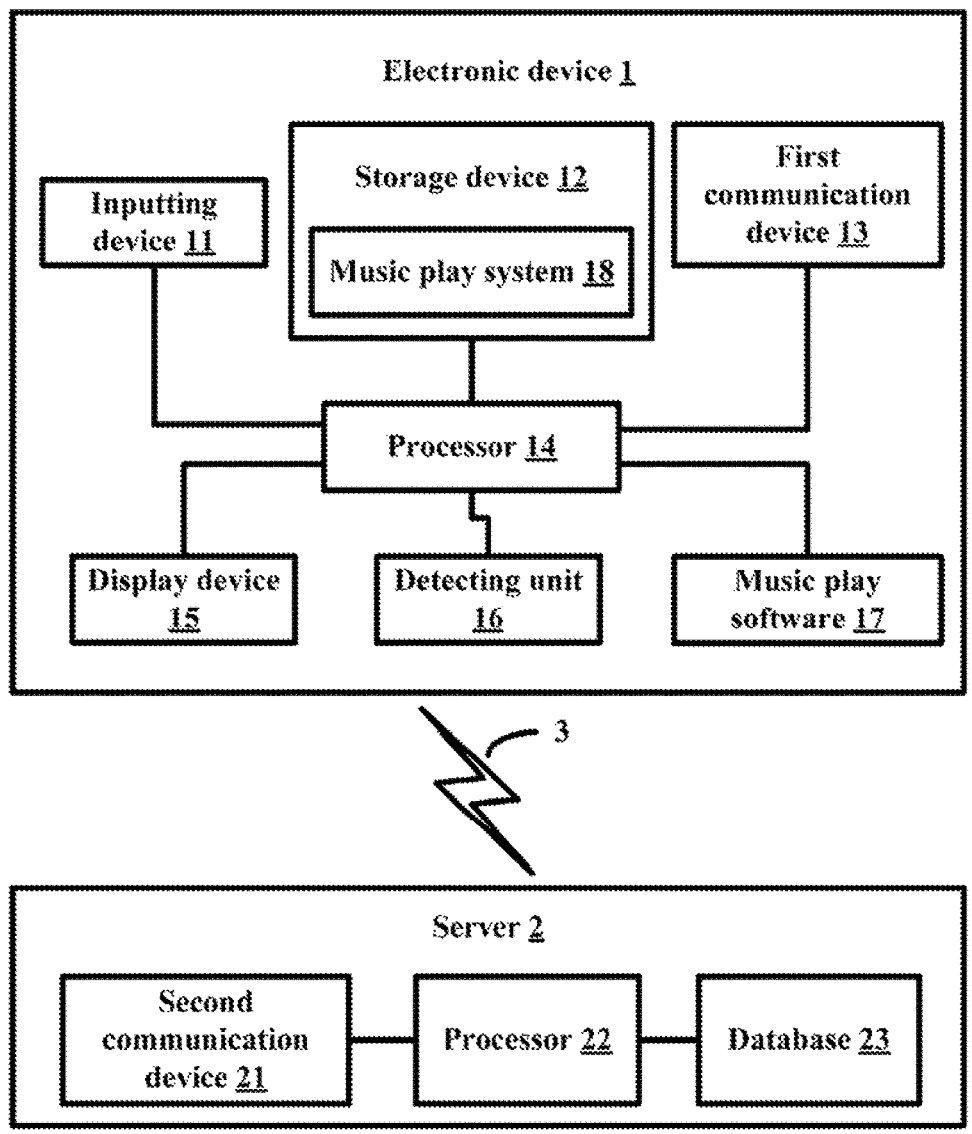
FIG. 1 is a block diagram of one embodiment of an electronic device and a server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device and a server. Depending on the embodiment, an electronic device may include, but is not limited to, an inputting device 11, a storage device 12, a first communication device 13, at least one processor 14, a display device 15, a detecting unit 16, a music play software 17, and a music play system 18. In at least one embodiment, the electronic device 1 can be a handheld device, a mobile terminal, a mobile phone, a smart phone, a personal digital assistant (PDA), a laptop, a tablet personal computer, a digital camera, or a smart wearable device (e.g., a smart watch, a smart band, smart clothes, smart shoes, smart glove, or any other suitable electronic device).

The inputting device 11 can be a touch screen, a keyboard, or a sound recognition device. The electronic device 1 can input data such as characters, pictures, hand gestures, or voice using the inputting device 11. The electronic device 1 can process data of the electronic device 1 using the at least one processor 14. The display device 15 can be used to display the data of the electronic device 1. For example, the display device 15 can display various kinds of user interfaces of the electronic device 1. In at least one embodiment, the display device 15 can be a display screen or a touch screen. The storage device 12 can be used to store various kinds of data, such as various kinds of audio files, music playlists, dynamic parameters, or situation parameters, For example.

The detecting unit 16 can include a plurality of detecting devices (not indicated in FIG. 1). The plurality of detecting devices can be internally or externally configured in the electronic device 1. For example, the plurality of detecting devices can be wirelessly or wired connected with the electronic device 1. In at least one embodiment, the plurality of the detecting devices can include, but are not limited to, a positioning device, a speed detecting device, an environment detecting device, and/or a sensing device. The positioning device can be used to detect a position of the electronic device 1. The speed detecting device can be used to detect a movement speed value of a user of the electronic device 1. The environment detecting device can be used to detect environment parameters such as a noise level, a temperature value, or a humidity level of an environment of the electronic device 1. The sensing device can be used to detect physiological parameters of the user of the electronic device 1. For example, the physiological parameters can be a heart rate, a blood pressure value, a number of walk steps, a sleep state, a value of consumed calories, a body temperature value, and a mood of the user.

In at least one embodiment, the positioning device can be a global position system (GPS) device. The electronic device 1 can receive GPS signals of at least three satellites using the GPS device of the detecting unit 16. The electronic device 1 can further process the GPS signals to obtain time of transmitting and a difference of carrier phase. The electronic device 1 can obtain a current position, a current movement speed value, and current time of the electronic device 1 by processing the time of transmitting and the difference of carrier phase. The environment detecting device can be a noise measuring instrument, a temperature sensor, or a humidity sensor. The sensing device can be a three-axis acceleration sensor. The electronic device 1 can calculate the number of walk steps of the user of the electronic device 1 using the three-axis acceleration sensor of the detecting unit 16. The electronic device 1 can further calculate the value of consumed calories of the user using the number of walk steps, an age, a weight value, a movement distance value, and a movement speed value of the user. The sensing device can be a heartbeat detecting sensor. The electronic device 1 can calculate a heartbeat frequency of the user using the heartbeat detecting sensor of the detecting unit 16. The sensing device can be a blood pressure detecting sensor. The electronic device 1 can calculate the blood pressure value of the user using the blood pressure detecting sensor of the detecting unit 16. The electronic device 1 can further record the heartbeat frequency and the blood pressure value. In other embodiments, the detecting unit 16 can include any suitable detecting device that can be used to detect the position, the movement speed value of the user of the electronic device 1, and the physiological parameters of the user of the electronic device 1.

In at least one embodiment, the electronic device 1 is installed with at least one music play software 17. The music play software 17 can be used to play audio files stored in the electronic device 1 or audio files received from other devices. In at least one embodiment, the music play software 17 can record data of audio files that have been played using the electronic device 1. The music play software 17 can also record music playlists set in the electronic device 1. The electronic device 1 can communicate with a server 2, and can receive audio files from the server 2. In at least one embodiment, the electronic device 1 can logs into the server 2 without an account number, or an authorization. In other embodiments, the electronic device 1 can log into the server 2 by sending an account and a password corresponding to the account to the server 2.

The electronic device 1 can communicate with the server 2 using the first communication device 13 and the second communication device 21. In at least one embodiment, the first communication device 13 and the second communication device 21 are WIFI devices. In other embodiments the first communication device 13 and the second communication device 21 can be wireless communication devices, such as 2G wireless communication devices, 3G wireless communication devices, or 4G wireless communication devices.

The server 2 can be a server that is used to provide music service, such as providing audio files of different formats. The server 2 can further include, but are not limited to, processor 22, and at least one database 23. The server 2 can process various kinds of data of the server 2 using the processor 22. The server 2 can store various kinds of account information, audio files, and video files of various kinds of formats using the at least one database 23. The account information can be used to log into the server 2. In at least one embodiment, the account information can include, but is not limited to, an account number, and a password corresponding to the account number.

In at least one embodiment, the database 23 can also store related information between each of the stored audio files. In at least one embodiment, the related information can include, but is not limited to, a singer's name, an album's name, a style, an emotion, a mood, a rhythm, and a suitable state correspond to each of the stored audio files. In at least one embodiment, the style can be a rock style, a metal style, a light style, a smooth style, a crystal style, or a classic style. The emotion can be joy, sorrow, vent, or relaxed. The mood can be a mood in travel, a mood disappointed in love, a mood in sweet, a mood in lonely, a mood in stunned, or a mood in dance. The rhythm can be slow, medium, or fast. The suitable state can be a state in working, a state in exercising, a state in gathering, or a state right before sleep. In at least one embodiment, the state in exercising can include, but is not limited to, a static state, a walking state, a running state, a bicycling state, and a driving state. In at least one embodiment, each of the stored audio files can correspond to one or more styles, one or more emotions, one or more moods, and one or more suitable states. The said style, emotion, mood, and the rhythm can be adjusted according to user's requirement. In at least one embodiment, when the electronic device 1 is in connection with the server 2, the server 2 can send the stored audio files and the related information corresponding to the stored audio files to the electronic device 1 for storing.

In at least one embodiment, the music play system 18 can include, but is not limited to, a first determining module 181, a requesting module 182, a detecting module 183, a second determining module 184, an adjusting module 185, and a storing module 186. In at least one embodiment, the modules 181-186 can include computerized codes in form of one or more programs, which are stored in the storage device 12, and are executed by the processor 14. In other embodiments, the modules 181-186 can be hardware or firmware. The music play system 18 can be used to provide a user with a most suitable music playlist.

In at least one embodiment, when the electronic device 1 executes the music play software 17, the first determining module 181 can determine a situation parameter of the electronic device 1 or at least one group of preference parameters of the electronic device 1. In at least one embodiment, the situation parameter can be determined according to information of movement speed, position information, time information, or environment information of the electronic device 1, or a combination of the information of movement speed, the position information, the time information, and the environment information of the electronic device 1. The at least one group of preference parameters can include, but is not limited to, parameters of preferred song, parameters of preferred style, parameters of preferred rhythm, parameters of preferred target of sport, target time length of sport, target distance value of sport, target value of consumed calories, or a combination of the parameters of preferred song, parameters of preferred style, parameters of preferred rhythm, parameters of preferred target of sport, target time length of sport, target distance value of sport, and the target value of consumed calories.

In at least one embodiment, the first determining module 181 can detect time information and/or position information of the electronic device 1. The first determining module 181 can further determine a current situation parameter of the electronic device 1 by comparing the detected time information with corresponding time condition, and comparing the detected position information with corresponding position condition. In at least one embodiment, the first determining module 181 can obtain current time using the processor 14. The first determining module 181 can determine whether "working", "before sleeping", or "rest" is the current situation parameter by comparing the current time with a plurality of preset time conditions. For example, the plurality of preset time conditions can include, but are not limited to, the "working" is the situation parameter corresponding to time that is within a first time range (e.g., from 9:00 am to 5:30 pm every Monday to Friday), the "rest" is the situation parameter corresponding to time that is within a second time range (e.g., before 9:00 am every Monday to Friday, after 5:30 pm till 9:00 pm every Monday to Friday, and from 8:00 am to 9:00 pm every Saturday to Sunday), and the "before sleeping" is the situation parameter corresponding to time that is within a third time range (e.g., after 9:00 pm everyday). For example, if the current time is 10:30 am of Monday, the first determining module 181 can determine the "working" is the current situation parameter of the electronic device 1. If the current time is 10:30 pm of Monday, the first determining module 181 can determine the "before sleeping" is the current situation parameter of the electronic device 1. If the current time is 2:00 pm of Sunday, the first determining module 181 can determine the "rest" is the current situation parameter of the electronic device 1. It should be noted that the plurality of preset time conditions can be set according to user's requirement.

The first determining module 181 can detect current position of the electronic device 1 using the detecting unit 16. The first determining module 181 can determine whether the "working" or the "rest" is the current situation parameter by comparing the current position with a plurality of preset position conditions. In at least one embodiment, the plurality of preset position conditions can include, but are not limited to, the "rest" is the situation parameter corresponding to a position that is within a first position range, the "working" is the situation parameter corresponding to a position that is within a second position range, and "exercising" is the situation parameter corresponding to a position that is within a third position range. In at least one embodiment, the first position range can be a position range of a home of a user of the electronic device 1. The second position range can be a position range of an office of the user. The third position range can be a position range of a gymnasium. It should be noted that the plurality of position conditions can be set according to places the user frequently visits and frequently listened music during visiting the places.

In at least one embodiment, the first determining module 181 can further determine whether the "exercising" is the current situation parameter by detecting a current movement speed value of the user of the electronic device 1. The first determining module 181 can further determine whether the "gathering" is the current situation parameter by detecting a current noise level of an current environment of the electronic device 1.

In at least one embodiment, the first determining module 181 can detect the current movement speed value of the user of the electronic device 1 using the detecting unit 16. The first determining module 181 can determine whether the "exercising" is the current situation parameter by comparing the current movement speed value with a first preset speed value (for example, 2 m/s), and comparing the current movement speed value with a second preset speed value (for example, 6 m/s). For example, when the current movement speed value is greater than the first preset speed value, but less than the second speed value, the first determining module 181 can determine the "exercising" is the current situation parameter. It should be noted that first preset speed value and the second preset speed value can be set according to user's requirement.

In at least one embodiment, the first determining module 181 can detect the current noise level using the detecting unit 16. The first determining module 181 can determine whether the "gathering" is the current situation parameter by comparing the current noise level with a preset noise level. For example, when the current noise level is greater than the preset noise level, the first determining module 181 can determine the "gathering" is the current situation parameter of the electronic device 1. It should be noted that the preset noise level can be set according to user's requirement.

Figure 3:
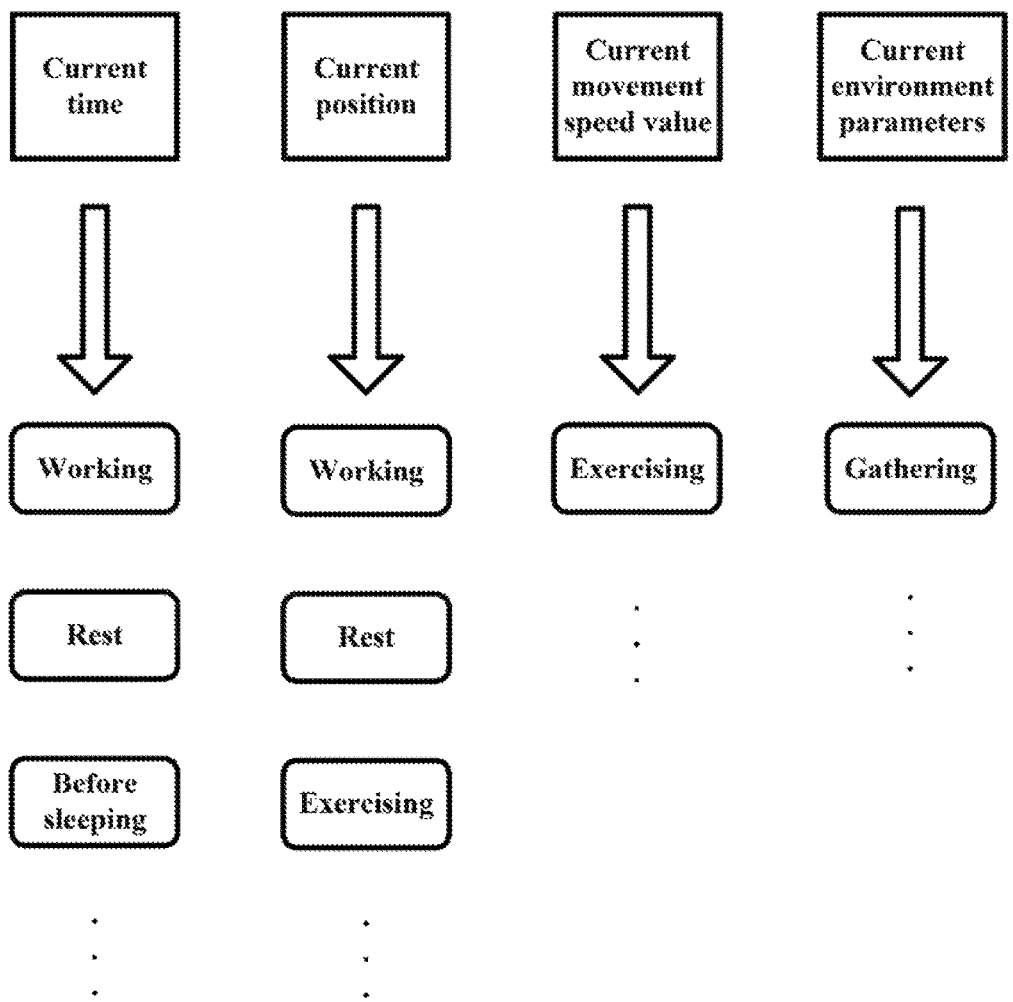
FIG. 3 illustrates an example of determining a situation parameter using the music play system.

Refer to FIG. 3, the first determining module 181 can determine whether the "working", "rest", "before sleeping", "exercising", or the "gathering" is the current situation parameter by detecting the current movement speed value, the current position, the current time, or the current environment parameters, or a combination of the current movement speed value, the current position, the current time, and the current environment parameters. In at least one embodiment, the first determining module 181 can determine whether the "working" is the current situation parameter more actually according to the current time (for example, from 9:00 am to 5:30 pm every Monday to Friday), the current position (for example, a position near an office), the current movement speed value (for example, 0), the current environment parameters (for example, the current noise level is less than the preset noise level). It should be noted that the said situation parameters can be distinguished in more detail.

Figure 4:
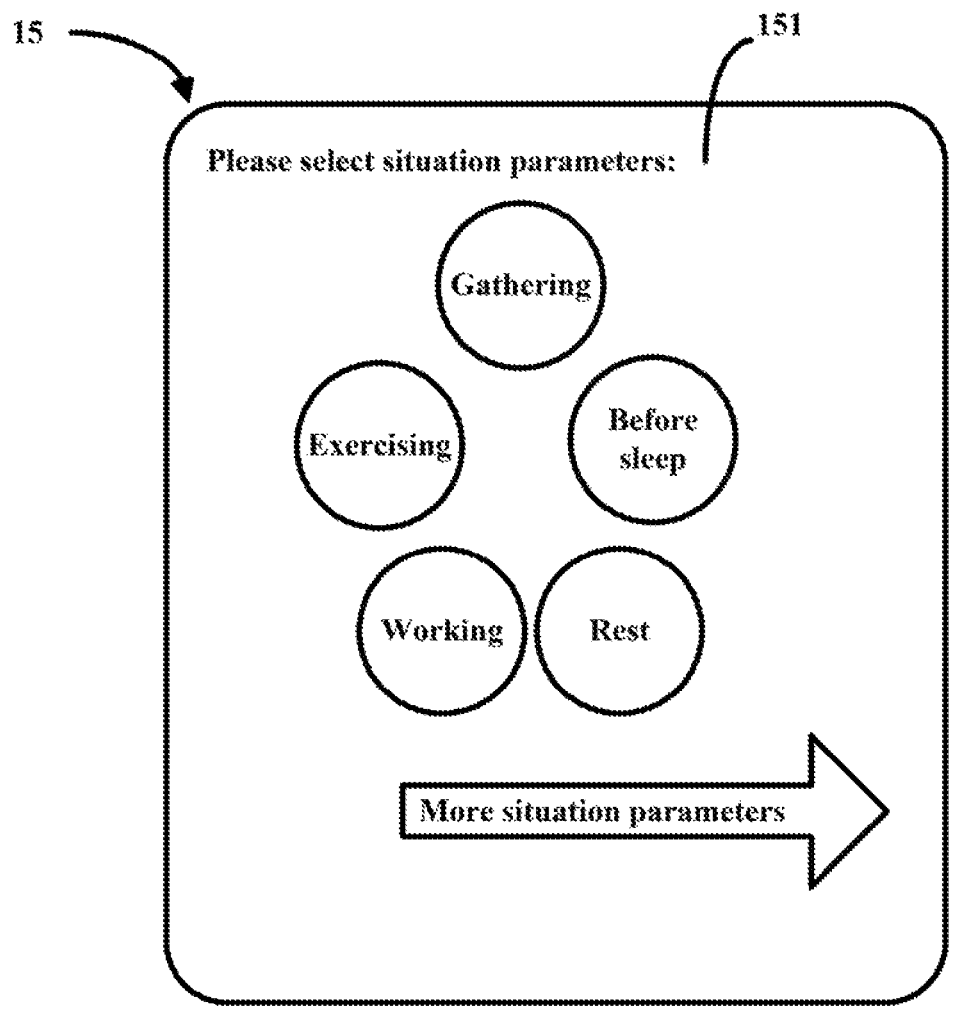
FIG. 4 illustrates an example of a first setting interface for setting a situation parameter.

In other embodiments, the first determining module 181 can display a first setting interface 151 on the display device 15 of the electronic device 1. The first setting interface 151 is used to set a situation parameter according to user's selection from the first setting interface 151. The first setting interface 151 can include a plurality of icons. Each of the plurality of icons can indicate each kinds of situation parameters. As illustrated in FIG. 4, For example, the plurality of icons can include, but are not limited to, an icon indicating the "working", an icon indicating the "exercising", an icon indicating the "gathering", an icon indicating the "before sleeping", and an icon indicating the "rest". In at least one embodiment, each of the plurality of icons can have a same shape and a same color. All the plurality of icons can construct a shape in any type. The user of the electronic device 1 can select a current situation parameter of the electronic device 1 from the first setting interface 151 using the inputting device 11. It should be noted that types of the situation parameter, a total number of the situation parameters, and an arrangement mode of the situation parameters are not limited as illustrated in FIG. 4.

Figure 5:
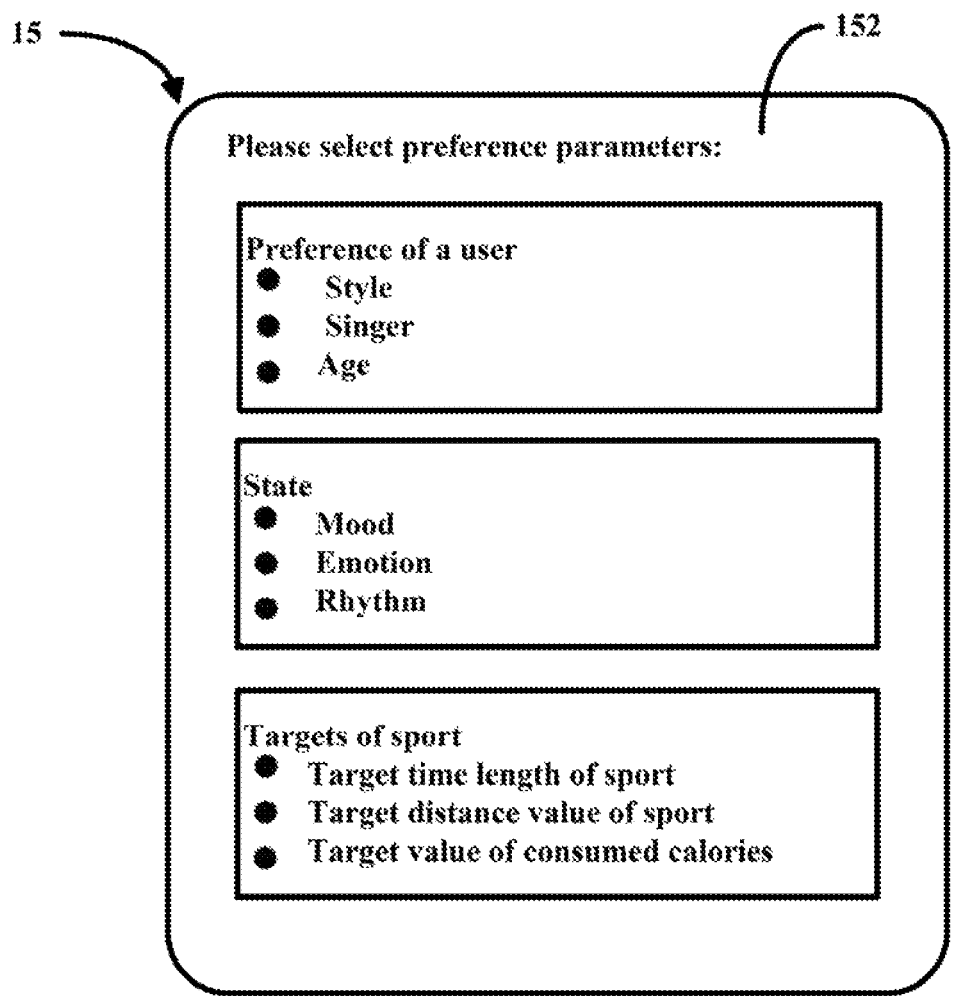
FIG. 5 illustrates an example of a second setting interface for setting preference parameters.

The first determining module 181 can determine at least one group of preference parameters by informing the user to input preference parameters. In at least one embodiment, the first determining module 181 can display a second setting interface 152 on the display device 15. The second setting interface 152 is used to set preference parameters according to user's selection. The first determining module 181 can determine the at least one group of preference parameters according to user's selection from the second setting interface 152. In at least one embodiment, the second setting interface 152 can include a plurality of different preference parameters for selecting. As illustrated in FIG. 5, the plurality of different preference parameters include "preference of a user", "state", and "targets of sport". A user can select "style" under the "preference of a user", and enter into a list (not indicated) that includes all kinds of styles. The user can select one or more kinds of styles from the list. When the user wants to do sport, the user can set "target time length of sport", "target distance value of sport", and "target value of consumed calories" under the "targets of sport". It should be noted that types of the preference parameters, a total number of the preference parameters, and an arrangement mode of the preference parameters are not limited as illustrated in FIG. 5.

It should be noted that if the user does not set any preference parameters, the first determining module 181 can automatically set a group of preference parameters according to the situation parameter detected by the detecting unit 16. For example, as illustrated in FIG. 5, if the "gathering" is the current situation parameter of the electronic device 1, the first determining module 181 can set the "mood" is "hot dance" under the preference parameters "state". For another example, if the "before sleep" is the current situation parameter of the electronic device 1, the first determining module 181 can set the "mood" is "relaxing" under the preference parameters "state". In other embodiments, the first determining module 181 can determine the preference parameters by querying related information of the audio files stored in the electronic device 1. In other embodiments, the first determining module 181 can further create a log to record that the electronic device 1 does not receive any preference parameters when the user does not set any preference parameters.

In at least one embodiment, the at least one group of preference parameters can further include a preferred country. The electronic device 1 can determine in which country the electronic device is currently located according to a current position that is detected by the detecting device such as the GPS device of the detecting unit 16. The first determining module 181 can automatically set the country that the electronic device 1 is currently located in to be the preferred country. Accordingly, a music playlist can be generated according to audio files that are popular in the country.

The requesting module 182 can generate a music playlist matching the determined situation parameter and/or the determined preference parameters, according to the determined situation parameter and/or the determined preference parameters. The requesting module 182 can further invoke the music play software 17 to play audio files of the generated music playlist. In at least one embodiment, the generated music playlist can include, but is not limited to, a name, a singer's name, time length, and a picture of each of the audio files of the generated music playlist.

In at least one embodiment, the requesting module 182 can communicate with the server 2 using the first communication device 13 and the second communication device 21. The requesting module 182 can send a request to the server 2 for obtaining audio files of the generated music playlist. In other embodiments, the requesting module 182 can log into the server 2 by sending the account information to the server 2, and send the request to the server 2 for obtaining the audio files of the generated music playlist.

In at least one embodiment, when the requesting module 182 sends the request to the server 2 for obtaining the audio files of the generated music playlist, the audio files of the generated music playlist can be streaming compression data, and can be stored in the server 2. The server 2 can send the streaming compression data to the electronic device 1. The processor 14 can decompress the streaming compression data and output the decompressed streaming compression data. In at least one embodiment, the streaming compression data can be audio files such as real audio, MS media player, apple quick time or the like.

In at least one embodiment, if some of the audio files of the generated music playlist are stored in the electronic device 1, the requesting module 182 can control the music play software 17 to adjust a play order of playing the audio files of the generated music playlist. For example, a sequence of playing an audio file that is stored in the electronic device 1 can be adjusted to be before a sequence of playing an audio file that is not stored in the electronic device 1.

In at least one embodiment, if the storage device 12 of the electronic device 1 stores the related information, the requesting module 182 can query audio files matching the determined situation parameter and/or the determined preference parameters, by searching the related information of the audio files stored in the storage device 12 according to the determined situation parameter and/or the determined preference parameters. The requesting module 182 can select a first predetermined number of audio files from the queried audio files randomly or according to a predetermined method. Then requesting module 182 can generate the music playlist according to the first predetermined number of audio files.

In other embodiments, if the storage device 12 of the electronic device 1 does not store the related information, the requesting module 182 can log into the server 2 by inputting the account information. The requesting module 182 can send the determined situation parameter and/or the determined preference parameters to the server 2. The requesting module 182 can send a request to the server 2 for obtaining the first predetermined number of audio files matching the determined situation parameter and/or the determined preference parameters. Then the requesting module 182 can generate the music playlist according to the first predetermined number of audio files.

For example, if the "working" is the current situation parameter of the electronic device 1, the determined preference parameters includes a singer "A", a singer "B", and further include the "mood" is "excited". The requesting module 182 can firstly query first audio files that corresponds to the singer "A" and the signer "B" by searching the storage device 12. The requesting module 182 can determine second audio files whose related information including the "mood" is "excited" from the first audio files, wherein the second audio files are suitable for the "working" (i.e., the current situation parameter of the electronic device 1). The requesting module 182 can determine the second audio files to be audio files matching the determined situation parameter and/or the determined preference parameters. In at least one embodiment, the generated music playlist can include, but is not limited to, a name, a singer's name, time length, and a picture of each of the second audio files.

In at least one embodiment, when the determined preference parameters includes the targets of sport such as the target time length of sport, the requesting module 182 can select a second predetermined number of audio files from the first predetermined number of audio files. The requesting module 182 can generate the music playlist according to the second predetermined number of audio files. In at least one embodiment, total time length of all the second predetermined number of audio files is substantially equal to the target time length of sport. In other words, a difference value between the total time length of all the second predetermined number of audio files and the target time length of sport is within a preset range of time length such as (−20 seconds, 20 seconds).

Figure 6:
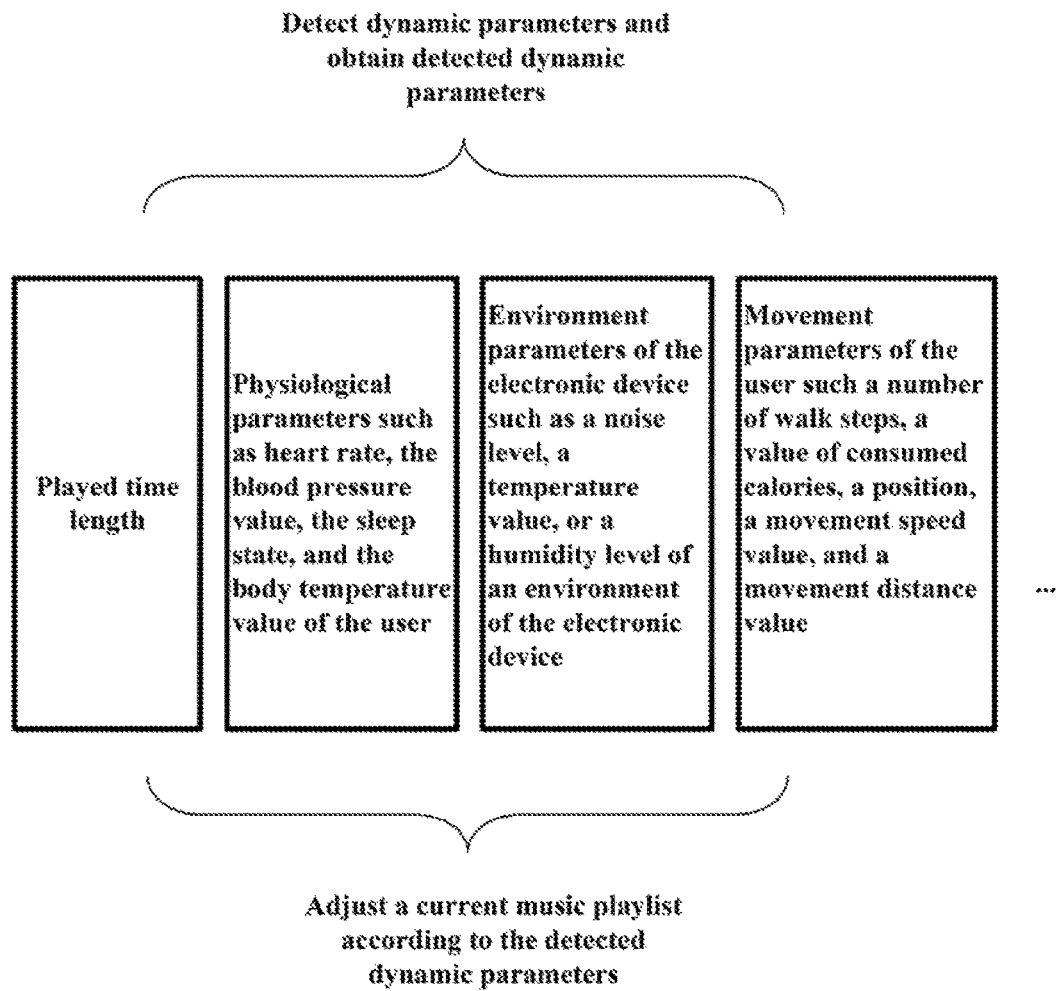
FIG. 6 illustrates an example of detecting dynamic parameters using the music playing system.

The detecting module 183 can periodically detect at least one group of dynamic parameters of the electronic device 1. The detecting module 183 can further record the at least one group of dynamic parameters. In at least one embodiment, when the electronic device 1 begins to play audio files of the generated music playlist, the detecting module 183 can detect the at least one group of dynamic parameters using the detecting unit 16. In at least one embodiment, as illustrated in FIG. 6, the at least one group of dynamic parameters can include, but are not limited to, played time lengths of audio files of the music playlist, the physiological parameters of the user of the electronic device 1, the environment parameters of the electronic device 1, and/or movement parameters of the user of the electronic device 1. In at least one embodiment, the played time length can be defined to be time length that an audio file of a current music playlist has been played for, when the electronic device 1 switches from the audio file to another audio file of the current music playlist. The physiological parameters of the user of the electronic device 1 can include, but is not limited to, the heart rate, the blood pressure value, the sleep state, and the body temperature value of the user. The environment parameters of the electronic device 1 can include, but is not limited to, the noise level, the temperature value, or the humidity level of the environment of the electronic device 1. The movement parameters of the user of the electronic device 1 can include, but is not limited to, the number of walk steps, the value of consumed calories, the position, the movement speed value, and the movement distance value of the user.

In at least one embodiment, when the determined preference parameters includes the targets of sport such as the target time length of sport, target distance value of sport, and/or target value of consumed calories, the detecting module 183 can detect current movement parameters (for example, the number of walk steps, the value of consumed calories, the position, the movement speed value, and/or the movement distance value) of the user of the electronic device 1. The detecting module 183 can further record time length of the user has sport for, the movement distance value, and the value of consumed calories.

The second determining module 184 can determine whether a current music playlist needs to be adjusted according to the detected dynamic parameters. In at least one embodiment, the second determining module 184 can determine whether the current music playlist needs to be adjusted by comparing the detected dynamic parameters with a corresponding preset value.

In at least one embodiment, the second determining module 184 can compare the played time length with preset time length. In at least one embodiment, the preset time length can be a value such as 10 seconds, or a range of time length such as (0 s, 30 s). When the played time length is less than the pre-set time length, the second determining module 184 can determine the current music playlist needs to be adjusted. In at least one embodiment, the second determining module 184 can determine whether the current music playlist matches the physiological parameters of the user of the electronic device 1. If the current music playlist does not match the physiological parameters of the user of the electronic device 1, the second determining module 184 can determine the current music playlist needs to be adjusted. For example, the second determining module 184 can switch from an audio file that is currently played to a next audio file of the current music playlist. In at least one embodiment, the second determining module 184 can determine whether the current music playlist matches the physiological parameters of the user of the electronic device 1, by comparing the physiological parameters of the user of the electronic device 1 with related information of the audio file that is currently played.

In at least one embodiment, when the environment parameters of the electronic device 1 such as the noise level is detected, the second determining module 184 can determine whether the noise level is greater than a first preset noise level, or the noise level is less than a second preset noise level. The first preset noise level is greater that the second preset noise level. When the noise level is greater than the first preset noise level, or the noise level is less than the second preset noise level, the second determining module 184 can determine the current music playlist needs to be adjusted. For example, the second determining module 184 can switch from an audio file that is currently played to a next audio file of the current music playlist.

In at least one embodiment, when the movement parameters of the electronic device 1 is detected, the second determining module 184 can determine target time length of sport that has not been finished or a remaining time length spent on an amount of unfinished sport, by respectively comparing the recorded time length of the user has sport for, the recorded movement distance value, and the recorded value of consumed calories with corresponding target values. If total time length of all audio files of the current music playlist that are not played is less than the target time length of sport that has not been finished, or the total time length is less than the remaining time length, the second determining module 184 can determine the current music playlist needs to be adjusted. For example, the second determining module 184 can determine the current music playlist needs to add more audio files.

In at least one embodiment, when the current music playlist needs to be adjusted, the adjusting module 185 can adjust the current music playlist according to the detected dynamic parameters. In at least one embodiment, when the played time length is less than the preset time length, the adjusting module 185 can adjust the current music playlist by deleting one or more audio files whose played time length is less than the pre-set time length from the current music playlist. In at least one embodiment, the deleted audio file has been played. In other embodiments, when the audio file is deleted from the current music playlist, the adjusting module 185 can query audio files matching the determined situation parameter or matching the determined situation parameter and the determined preference parameters. The adjusting module 185 can select a predetermined number of audio files from the queried audio files, and add the predetermined number of audio files into the current music playlist.

In at least one embodiment, when the current music playlist does not match the physiological parameters of the user of the electronic device 1, the adjusting module 185 can search one audio file matching the physiological parameters of the user of the electronic device 1 from the current music playlist, and determine the searched audio file to be played next. If no audio file matching the physiological parameters of the user of the electronic device 1 can be founded from the current music playlist, the adjusting module 185 can select one audio file matching the physiological parameters of the user of the electronic device 1 from audio files matching the determined situation parameter and/or the determined preference parameters. The adjusting module 185 can add the selected audio file into the current music playlist.

For example, if the physiological parameters of the user of the electronic device 1 includes the heart rate, the blood pressure value, or the body temperature value of the user, the adjusting module 185 can determine whether the physiological parameters of the user of the electronic device 1 is greater than corresponding first preset value of physiological parameters. When the physiological parameters of the user of the electronic device 1 is greater than the corresponding first preset value of physiological parameters, the adjusting module 185 can search one audio file whose rhythm is fast enough from the current music playlist, and determine the searched audio file be played next. If no audio file whose rhythm is fast enough can be founded from the current music playlist, the adjusting module 185 can select an audio file whose rhythm is fast enough from the audio files matching the determined situation parameter and/or the determined preference parameters, and add the selected audio file into the current music playlist. When the physiological parameters of the user of the electronic device 1 is less than the corresponding first preset value of physiological parameters, the adjusting module 185 can determine whether the physiological parameters of the user of the electronic device 1 is less than corresponding second preset value of physiological parameters. The corresponding second preset value of physiological parameters is less than the corresponding first preset value of physiological parameters. When the physiological parameters of the user of the electronic device 1 is less than the corresponding second preset value of physiological parameters, the adjusting module 185 can search one audio file whose rhythm is slow from the current playlist, and determine the searched audio file to be played next. If no audio file whose rhythm is slow can founded from the current playlist, the adjusting module 185 can select one audio file whose rhythm is slow from the audio files matching the determined situation parameter and/or the determined preference parameters, and add the selected audio file into the current music playlist.

If detected noise level is greater than the first preset noise level, the adjusting module 185 can adjust the current music playlist by increasing a volume of the electronic device 1 plays audio files of the current music playlist. If the detected noise level is less than the first preset noise level, the adjusting module 185 can adjust the current music playlist by decreasing the volume of the electronic device 1 plays audio files of the current music playlist.

If the total time length of all audio files of the current music playlist that are not played is less than the target time length of sport that has not been finished, the adjusting module 185 can calculate a first difference value of time length between the total time length and the target time length of sport that has not been finished. If the total time length is less than the time length spent on the amount of unfinished sport, the adjusting module 185 can calculate a second difference value of time length between the total time length and the time length spent on the amount of unfinished sport. The adjusting module 185 can select one or more audio files matching the first difference value of time length or the second difference value of time length from the audio files matching the determined situation parameter and/or the determined preference parameters. The adjusting module 185 can further add the one or more selected audio files into the current music playlist. In at least one embodiment, a difference value of time length between time length of each of the one or more audio files and the first difference value of time length is less than a preset value such as 10 seconds, or the difference value of time length between the time length of each of the one or more audio files and the second difference value of time length is less than the preset value.

The second determining module 184 can further determine whether the electronic device 1 has ended the music play software 17. If the electronic device 1 has ended the music play software 17, the storing module 186 can store the current music playlist and the situation parameter and/or preference parameters of the electronic device 1 corresponding to the current music playlist into the storage device 12. It should be noted that if one or more music playlists and corresponding situation parameter and/or preference parameters have been stored in the storage device 12, when the electronic device 1 executes the music play software 17 next time, the music play system 18 can detect current situation parameter and/or current preference parameters of the electronic device 1, and determine whether the storage device 12 stores a music playlist matching the current situation parameter and/or current preference parameters of the electronic device 1. If the storage device 12 stores a music playlist matching the current situation parameter and/or current preference parameters of the electronic device 1, the music play system 18 can directly control the music play software 17 to play audio files of the music playlist that matches the current situation parameter and/or current preference parameters of the electronic device 1. In other embodiments, the storing module 186 can periodically store at least one group of dynamic parameters of the electronic device 1.

In at least one embodiment, when the storing module 186 stores the current music playlist and corresponding situation parameter and/or preference parameters of the electronic device 1 into the storage device 12, the storing module 186 can inform a user of the electronic device 1 to set a tag for each of the stored music playlists. The storing module 186 can upload the tag and corresponding music playlist, or upload music playlists and corresponding situation parameter and/or preference parameters of the electronic device 1 into the server 2 or into other music platform for sharing.

Figure 2:
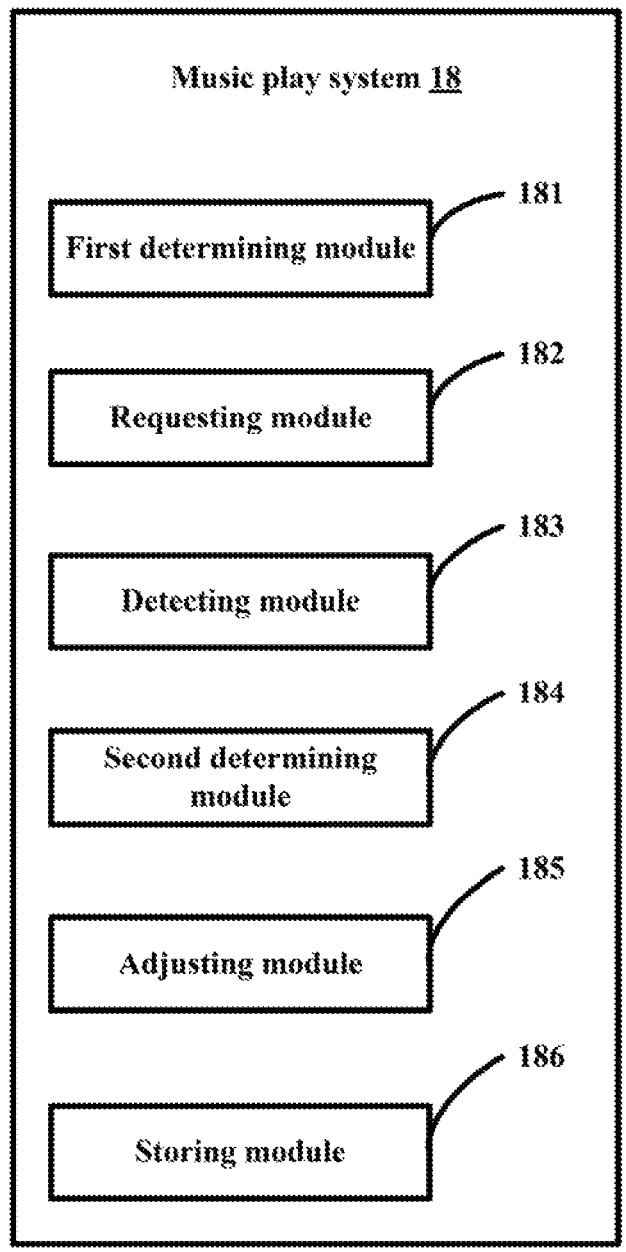
FIG. 2 is a block diagram of one embodiment of modules of a music play system installed in the electronic device of FIG. 1.
Figure 7:
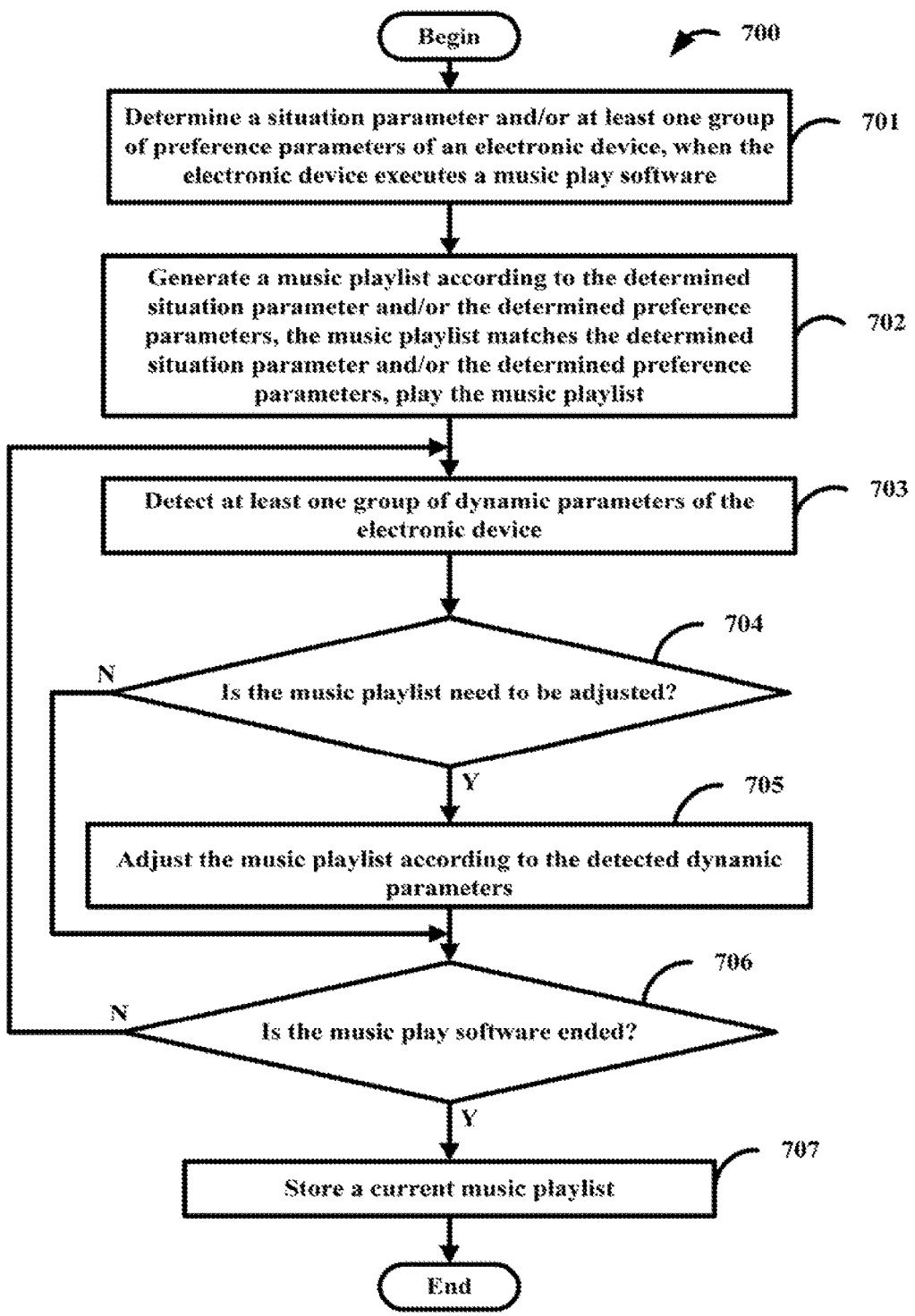
FIG. 7 illustrates a flow chart of one embodiment of a method for play music.

FIG. 7 illustrates a flowchart of one embodiment of playing music. The example method 700 is provided by way of example, as there are a variety of ways to carry out the method. The method 700 described below can be carried out using the configurations illustrated in FIG. 1 and FIG. 2, for example, and various elements of these figures are referenced in explaining example method 700. Each block shown in FIG. 7 represents one or more processes, methods or subroutines, carried out in the exemplary method 700. Additionally, the illustrated order of blocks is by example only and the order of the blocks can be changed according to the present disclosure. The exemplary method 700 can begin at block 701. Depending on the embodiment, additional steps can be added, others removed, and the ordering of the steps can be changed.

At block 701, when the electronic device 1 executes the music play software 17, the first determining module 181 can determine a situation parameter of the electronic device 1 or at least one group of preference parameters of the electronic device 1. In at least one embodiment, the situation parameter can be determined according to information of movement speed, position information, time information, or environment information of the electronic device 1, or a combination of the information of movement speed, the position information, the time information, and the environment information of the electronic device 1. The at least one group of preference parameters can include, but is not limited to, parameters of preferred song, parameters of preferred style, parameters of preferred rhythm, parameters of preferred target of sport, target time length of sport, target distance value of sport, target value of consumed calories, or a combination of the parameters of preferred song, parameters of preferred style, parameters of preferred rhythm, parameters of preferred sport, target time length of sport, target distance value of sport, and the target value of consumed calories.

In at least one embodiment, the first determining module 181 can detect current time information, current position information, a current information of movement speed, or current environment information of the electronic device 1. The first determining module 181 can determine whether "working", "rest", "before sleeping", "sport", or "gathering" is current situation parameter of the electronic device 1. It should be noted that category of the situation parameters can be divided according to user's requirement.

In at least one embodiment, the first determining module 181 can obtain current time using the processor 14. The first determining module 181 can determine whether "working", "before sleeping", or "rest" is the current situation parameter of the electronic device 1 by comparing the current time with a plurality of preset time conditions. The first determining module 181 can detect current position of the electronic device 1 using the detecting unit 16. The first determining module 181 can determine whether the "working", the "rest", or "exercising" is the current situation parameter of the electronic device 1 by comparing the current position with a plurality of preset position conditions.

In at least one embodiment, the first determining module 181 can detect the current movement speed value of the user of the electronic device 1 using the detecting unit 16. The first determining module 181 can determine whether the "exercising" is the current situation parameter by comparing the current movement speed value with a first preset speed value (for example, 2 m/s), and comparing the current movement speed value with a second preset speed value (for example, 6 m/s). In at least one embodiment, the first determining module 181 can detect the current noise level using the detecting unit 16. The first determining module 181 can determine whether the "gathering" is the current situation parameter by comparing the current noise level with a preset noise level.

In other embodiments, the first determining module 181 can display a first setting interface 151 on the display device 15 of the electronic device 1. The first setting interface 151 is used to set situation parameter according to user's selection from the first setting interface 151.

In at least one embodiment, the first determining module 181 can determine at least one group of preference parameters by informing the user to input preference parameters. In at least one embodiment, the first determining module 181 can display a second setting interface 152 on the display device 15. The second setting interface 152 is used to set preference parameters according to user's selection. The first determining module 181 can determine the at least one group of preference parameters according to user's selection from the second setting interface 152. If the user does not set any preference parameters, the first determining module 181 can automatically set a group of preference parameters according to the situation parameter detected by the detecting unit 16. For example, if the "gathering" is the current situation parameter of the electronic device 1, the first determining module 181 can set the "mood" is "hot dance" under the preference parameters "state". For another example, if the "before sleep" is the current situation parameter of the electronic device 1, the first determining module

181 can set the "mood" is "relaxing" under the preference parameters "state". In other embodiments, the first determining module 181 can determine the preference parameters by querying related information of the audio files stored in the electronic device 1. In other embodiments, the first determining module 181 can further create a log to record that the electronic device 1 does not receive any preference parameters when the user does not set any preference parameters.

In at least one embodiment, the at least one group of preference parameters can further include a preferred country. The electronic device 1 can determine in which country the electronic device is currently located according to a current position that is detected by the detecting device such as the GPS device of the detecting unit 16. The first determining module 181 can automatically set the country that the electronic device 1 is currently located in to be the preferred country. Accordingly, a music playlist can be generated according to audio files that are popular in the country. For example, if the electronic device 1 determines that the electronic device 1 is currently located in India according to position information detected by the GPS device, the first determining module 181 can set India is the preferred country, and set Indian style is the preferred style to be the situation parameter of the electronic device 1. For another example, if the electronic device 1 determines that the electronic device 1 is currently located in Japan according to the position information detected by the GPS device, the first determining module 181 can set Japan is the preferred country, and set Japanese popular style is the preferred style to be the situation parameter of the electronic device 1.

At block 702, the requesting module 182 can generate a music playlist matching the determined situation parameter and/or the determined preference parameters, according to the determined situation parameter and/or the determined preference parameters. In at least one embodiment, the generated music playlist can include, but is not limited to, a name, a singer's name, time length, and a picture of each of the audio files of the generated music playlist.

In at least one embodiment, if the storage device 12 of the electronic device 1 stores the related information, the requesting module 182 can query audio files matching the determined situation parameter and/or the determined preference parameters, by searching the related information stored in the storage device 12 according to the determined situation parameter and/or the determined preference parameters. The requesting module 182 can select a first predetermined number of audio files from the queried audio files randomly or according to a predetermined method. Then requesting module 182 can generate the music playlist according to the first predetermined number of audio files.

In other embodiments, if the storage device 12 of the electronic device 1 does not store the related information, the requesting module 182 can log into the server 2 by inputting the account information. The requesting module 182 can send the determined situation parameter and/or the determined preference parameters to the server 2. The requesting module 182 can send a request to the server 2 for obtaining the first predetermined number of audio files matching the determined situation parameter and/or the determined preference parameters. Then the requesting module 182 can generate the music playlist according to the first predetermined number of audio files.

In other embodiments, if the requesting module 182 cannot detect the situation parameter and/or cannot detect the at least one group of preference parameters, the requesting module 182 can generate the music playlist according to audio files stored in the storage device 12. In other embodiments, if the storage device 12 does not store audio files, the requesting module 182 can log into the server 2 by sending the account information to the server 2. The requesting module 182 can obtain a music playlist matching the account information, or obtain a music playlist randomly. The requesting module 182 can further receive audio files of the obtained music playlist, and play the audio files of the obtained music playlist.

At block 703, the detecting module 183 can periodically detect at least one group of dynamic parameters of the electronic device 1. The detecting module 183 can further record the at least one group of dynamic parameters. In at least one embodiment, when the electronic device 1 begins to play audio files of the generated music playlist, the detecting module 183 can detect the at least one group of dynamic parameters using the detecting unit 16. In at least one embodiment, as illustrated in FIG. 6, the at least one group of dynamic parameters can include, but are not limited to, played time length, the physiological parameters of the user of the electronic device 1, the environment parameters of the electronic device 1, movement parameters of the user of the electronic device 1. In at least one embodiment, the played time length can be defined to be time length that an audio file of a current music playlist has been played for, when the electronic device 1 switches from the audio file to another audio file of the current music playlist. The physiological parameters of the user of the electronic device 1 can include, but is not limited to, the heart rate, the blood pressure value, the sleep state, and the body temperature value of the user. The environment parameters of the electronic device 1 can include, but is not limited to, the noise level, the temperature value, or the humidity level of the environment of the electronic device 1. The movement parameters of the user of the electronic device 1 can include, but is not limited to, the number of walk steps, the value of consumed calories, the position, the movement speed value, and the movement distance value of the user.

In at least one embodiment, when the determined preference parameters includes the targets of sport such as the target time length of sport, target distance value of sport, and/or target value of consumed calories, the detecting module 183 can detect current movement parameters (for example, the number of walk steps, the value of consumed calories, the position, the movement speed value, and/or the movement distance value) of the user of the electronic device 1. The detecting module 183 can further record time length of the user has sport for, the movement distance value, and the value of consumed calories.

At block 704, the second determining module 184 can determine whether a current music playlist needs to be adjusted according to the detected dynamic parameters. In at least one embodiment, the second determining module 184 can determine whether the current music playlist needs to be adjusted by comparing the detected dynamic parameters with a corresponding preset value. When the current music playlist needs to be adjusted, the process goes to block 705. When the current music playlist is determined to be not adjusted, the process goes to block 706.

In at least one embodiment, the second determining module 184 can compare the recorded played time length with preset time length. In at least one embodiment, the preset time length can be a value such as 10 seconds, or a range of time length such as (0 s, 30 s). When the recorded played time length is less than the preset time length, the second determining module 184 can determine the current music playlist needs to be adjusted. In at least one embodiment, the second determining module 184 can determine whether the current music playlist matches the physiological parameters of the user of the electronic device 1. If the current music playlist does not match the physiological parameters of the user of the electronic device 1, the second determining module 184 can determine the current music playlist needs to be adjusted. In at least one embodiment, the second determining module 184 can determine whether the current music playlist matches the physiological parameters of the user of the electronic device 1, by comparing the physiological parameters of the user of the electronic device 1 with related information of the audio file that is currently played.

In at least one embodiment, when the environment parameters of the electronic device 1 such as the noise level is detected, the second determining module 184 can determine whether the noise level is greater than a first preset noise level, or the noise level is less than a second preset noise level. The first preset noise level is greater that the second preset noise level. When the noise level is greater than the first preset noise level, or the noise level is less than the second preset noise level, the second determining module 184 can determine the current music playlist needs to be adjusted.

In at least one embodiment, when the movement parameters of the electronic device 1 is detected, the second determining module 184 can determine target time length of sport that has not been finished or an amount of unfinished sport, by respectively comparing the recorded time length of the user has sport for, the recorded movement distance value, and the recorded value of consumed calories with corresponding target values. If total time length of all audio files of the current music playlist that are not played is less than the target time length of sport that has not been finished, or the total time length is less than a time length spent on the amount of unfinished sport, the second determining module 184 can determine the current music playlist needs to be adjusted.

At block 705, In at least one embodiment, when the current music playlist needs to be adjusted, the adjusting module 185 can adjust the current music playlist according to the detected dynamic parameters. When the block 705 has been executed, the process goes to block 706. In at least one embodiment, when the played time length is less than the preset time length, the adjusting module 185 can adjust the current music playlist by deleting one or more audio files whose played time length is less than the preset time length from the current music playlist. In at least one embodiment, the deleted audio file has been played. In other embodiments, when the audio file is deleted from the current music playlist, the adjusting module 185 can query audio files matching the determined situation parameter or matching the determined situation parameter and the determined preference parameters. The adjusting module 185 can select a predetermined number of audio files from the queried audio files, and add the predetermined number of audio files into the current music playlist.

In at least one embodiment, when the current music playlist does not match the physiological parameters of the user of the electronic device 1, the adjusting module 185 can search one audio file matching the physiological parameters of the user of the electronic device 1 from the current music playlist, and determine the searched audio file to be played next. If no audio file matching the physiological parameters of the user of the electronic device 1 can be founded from the current music playlist, the adjusting module 185 can select one audio file matching the physiological parameters of the user of the electronic device 1 from audio files matching the determined situation parameter and/or the determined preference parameters. The adjusting module 185 can add the selected audio file into the current music playlist.

If detected noise level is greater than the first preset noise level, the adjusting module 185 can adjust the current music playlist by increasing a volume of the electronic device 1 plays audio files of the current music playlist. If the detected noise level is less than the first preset noise level, the adjusting module 185 can adjust the current music playlist by decreasing the volume of the electronic device 1 plays audio files of the current music playlist.

If the total time length of all audio files of the current music playlist that are not played is less than the target time length of sport that has not been finished, the adjusting module 185 can calculate a first difference value of time length between the total time length and the target time length of sport that has not been finished. If the total time length is less than the time length spent on the amount of unfinished sport, the adjusting module 185 can calculate a second difference value of time length between the total time length and the time length spent on the amount of unfinished sport. The adjusting module 185 can select one or more audio files matching the first difference value of time length or the second difference value of time length from the audio files matching the determined situation parameter and/or the determined preference parameters. The adjusting module 185 can further add the one or more audio files into the current music playlist. In at least one embodiment, a difference value of time length between time length of each of the one or more audio files and the first difference value of time length is less than a preset value such as 10 seconds, or the difference value of time length between the time length of each of the one or more audio files and the second difference value of time length is less than the preset value.

At block 706, the second determining module 184 can further determine whether the electronic device 1 has ended the music play software 17. If the electronic device 1 has ended the music play software 17, the process goes to block 707. If the music play software 17 is being executed by the electronic device 1, the process goes to block 703.

At block 707, the storing module 186 can store the current music playlist and the situation parameter and/or preference parameters of the electronic device 1 corresponding to the current music playlist into the storage device 12. In at least one embodiment, the current music playlist stored in the storage device 12 can be the music playlist generated at block 703, or a music playlist that has been adjusted at block 706.

It should be noted that if one or more music playlists and corresponding situation parameters and/or preference parameters have been stored in the storage device 12, when the electronic device 1 executes the music play software 17 next time, and the music play system 18 has detected the current situation parameter and/or current preference parameters of the electronic device 1 at block 701, the music play system 18 can determine whether the storage device 12 stores a music playlist matching the current situation parameter and/or current preference parameters of the electronic device 1. If the storage device 12 stores a music playlist matching the current situation parameter and/or current preference parameters of the electronic device 1, block 702 can be skipped and the process can go to block 703 directly to control the music play software 17 to play audio files of the music playlist that matches the current situation parameter and/or current preference parameters of the electronic device 1.

At block 708, in at least one embodiment, when the storing module 186 stores the current music playlist and corresponding situation parameter and/or preference parameters of the electronic device 1 into the storage device 12, the storing module 186 can inform a user of the electronic device 1 to set a tag for each of the stored music playlists. The storing module 186 can upload the tag and corresponding music playlist, or upload music playlists and corresponding situation parameter and/or preference parameters of the electronic device 1 into the server 2 or into other music platform for sharing.

It should be noted that the method of playing music can begin at block 703. In other words, the blocks 701 and 702 can be removed. If audio files are determined to be added into the current music playlist at block 704 and block 705, block 701 can be executed to determine the situation parameter and/or the at least one group of preference parameters, one or more audio files can be selected from the audio files matching the situation parameter and/or the at least one group of preference parameters, and the one or more audio files can be added into the current music playlist.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A music playing method using an electronic device, the electronic device comprising a storage device, the method comprising:
    detecting at least one group of dynamic parameters of the electronic device and obtaining detected dynamic parameters, wherein the at least one group of dynamic parameters comprises parameters that are selected from a group consisting of played time lengths of audio files of the music playlist, physiological parameters of a user of the electronic device, environment parameters of the electronic device, and movement parameters of the user of the electronic device;
    determining whether a music playlist of the electronic device needs to be adjusted according to the detected dynamic parameters; and
    adjusting, when the music playlist needs to be adjusted, the music playlist according to the detected dynamic parameters and obtaining an adjusted music playlist;
    wherein adjusting the music playlist according to the dynamic parameters comprises:
        comparing a recorded played time length with a preset time length, when a played time length of a current audio file of the electronic device is detected;
        determining the music playlist needs to be adjusted when the recorded played time length is less than the preset time length; and
        adjusting the music playlist by deleting an audio file of which the played time length is less than the preset time length from the music playlist.

2. The method according to claim 1, further comprising:
determining a situation parameter or at least one group of preference parameters of the electronic device and obtaining determined situation parameter or determined preference parameters; and
generating the music playlist according to the determined situation parameter or the determined preference parameters, wherein the music playlist matches the determined situation parameter or the determined preference parameters.

3. The method according to claim 2, wherein the situation parameter is determined according to information that is selected from a group including information of movement speed, position information, time information, and/or environment information of the electronic device, the at least one group of preference parameters comprises parameters that are selected from a group including parameters of preferred song, parameters of preferred style, parameters of preferred rhythm, parameters of preferred target of sport, target time length of sport, target distance value of sport, and/or target value of consumed calories.

4. The method according to claim 2, further comprising:
providing at least one group of situation parameters or at least one group of preference parameters for selecting.

5. The method according to claim 2, further comprising:
querying audio files matching the determined situation parameter or querying audio files matching the determined preference parameters and obtaining queried audio files, by searching related information of the audio files stored in the storage device;
selecting a predetermined number of audio files from the queried audio files; and
generating the music playlist according to the predetermined number of audio files.

6. The method according to claim 2, further comprising:
sending the determined situation parameter or the determined preference parameters to a server that is in electronic connection with the electronic device and sending a request to the server for obtaining the music playlist, wherein the music playlist matches the determined situation parameter or the determined preference parameters.

7. The method according to claim 2, further comprising:
storing the music playlist, the adjusted music playlist, the situation parameter or at least one group of preference parameters corresponding to the music playlist into the storage device.

8. The method according to claim 1, wherein the detecting of the at least one group of dynamic parameters comprises recording the at least one group of dynamic parameters when the electronic device begins to play audio files of the music playlist.

9. The method according to claim 1, further comprising:
searching a first audio file matching a physiological parameter of the user of the electronic device from the music playlist and obtaining a searched first audio file, when the physiological parameter of the user is detected;
determining the searched first audio file to be played next;
searching a second audio file matching the physiological parameter of the user from the electronic device or a server connected to the electronic device, when no audio file matching the physiological parameter of the user of the electronic device is found from the music playlist; and
adding the second audio file into the music playlist.

10. The method according to claim 1, further comprising:
determining a remaining time length by comparing a movement parameter of the electronic device with a preset target value, when the movement parameter is detected;
calculating a difference value of time length between total time length of all audio files of the music playlist that are not played and the remaining time length, if the total time length is less than the remaining time length;
selecting one or more audio files matching the difference value of time length from the electronic device or a server connected to the electronic device; and
adding the one or more selected audio files into the music playlist.

11. An electronic device, comprising:
at least one processor; and
a storage device that stores one or more programs, when executed by the at least one processor, cause the at least one processor to:
detect at least one group of dynamic parameters of the electronic device and obtain detected dynamic parameters, wherein the at least one group of dynamic parameters comprises parameters that are selected from a group consisting of played time lengths of audio files of the music playlist, physiological parameters of a user of the electronic device, environment parameters of the electronic device, and movement parameters of the user of the electronic device;
determine whether a music playlist of the electronic device needs to be adjusted according to the detected dynamic parameters; and
adjust, when the music playlist needs to be adjusted, the music playlist according to the detected dynamic parameters and obtain an adjusted music playlist;
wherein adjusting the music playlist according to the dynamic parameters comprises:
comparing a recorded played time length with a preset time length, when a played time length of a current audio file of the electronic device is detected;
determining the music playlist needs to be adjusted when the recorded played time length is less than the preset time length; and
adjusting the music playlist by deleting an audio file of which the played time length is less than the preset time length from the music playlist.

12. The electronic device according to claim 11, wherein the at least one processor is further caused to:
determine a situation parameter or at least one group of preference parameters of the electronic device and obtain determined situation parameter or determined preference parameters; and
generate the music playlist according to the determined situation parameter or the determined preference parameters, wherein the music playlist matches the determined situation parameter or the determined preference parameters.

13. The electronic device according to claim 12, wherein the situation parameter is determined according to information that is selected from a group including information of movement speed, position information, time information, and/or environment information of the electronic device, the at least one group of preference parameters comprises parameters that are selected from a group including parameters of preferred song, parameters of preferred style, parameters of preferred rhythm, parameters of preferred target of sport, target time length of sport, target distance value of sport, and/or target value of consumed calories.

14. The electronic device according to claim 12, wherein the at least one processor is further caused to:

provide at least one group of situation parameters or at least one group of preference parameters for selecting.

15. The electronic device according to claim 12, wherein the at least one processor is further caused to:

query audio files matching the determined situation parameter or query audio files matching the determined preference parameters and obtain queried audio files, by searching related information of the audio files stored in the storage device;

select a predetermined number of audio files from the queried audio files; and generate the music playlist according to the predetermined number of audio files.

16. The electronic device according to claim 12, wherein the at least one processor is further caused to:

send the determined situation parameter or the determined preference parameters to a server that is in electronic connection with the electronic device and send a request to the server for obtaining the music playlist, wherein the music playlist matches the determined situation parameter or the determined preference parameters.

17. The electronic device according to claim 12, wherein the at least one processor is further caused to:

store the music playlist, the adjusted music playlist, the situation parameter or at least one group of preference parameters corresponding to the music playlist into the storage device.

18. The electronic device according to claim 11, wherein the detecting of the at least one group of dynamic parameters comprises recording the at least one group of dynamic parameters when the electronic device begins to play audio files of the music playlist.

19. The electronic device according to claim 11, wherein the at least one processor is further caused to:

search a first audio file matching a physiological parameter of the user of the electronic device from the music playlist and obtain a searched first audio file, when the physiological parameter of the user is detected;

determine the searched first audio file to be played next;

search a second audio file matching the physiological parameter of the user from the electronic device or a server connected to the electronic device, when no audio file matching the physiological parameter of the user of the electronic device is found from the music playlist; and add the second audio file into the music playlist.

20. The electronic device according to claim 11, wherein the at least one processor is further caused to:

determine a remaining time length by comparing a movement parameter of the electronic device with a preset target value, when the movement parameter is detected;

calculate a difference value of time length between total time length of all audio files of the music playlist that are not played and the remaining time length, if the total time length is less than the remaining time length;

select one or more audio files matching the difference value of time length from the electronic device or a server connected to the electronic device; and add the one or more selected audio files into the music playlist.

21. A non-transitory storage medium having stored thereon instructions that, when executed by a processor of an electronic device, causes the processor to perform a music play method, the electronic device comprising a storage device, wherein the method comprises:

detecting at least one group of dynamic parameters of the electronic device and obtaining detected dynamic parameters, wherein the at least one group of dynamic parameters comprises parameters that are selected from a group consisting of played time lengths of audio files of the music playlist, physiological parameters of a user of the electronic device, environment parameters of the electronic device, and movement parameters of the user of the electronic device;

determining whether a music playlist of the electronic device needs to be adjusted according to the detected dynamic parameters; and adjusting, when the music playlist needs to be adjusted, the music playlist according to the detected dynamic parameters and obtaining an adjusted music playlist;

wherein adjusting the music playlist according to the dynamic parameters comprises:

comparing a recorded played time length with a preset time length, when a played time length of a current audio file of the electronic device is detected;

determining the music playlist needs to be adjusted when the recorded played time length is less than the preset time length; and adjusting the music playlist by deleting an played audio file of which the played time length is less than the preset time length from the music playlist.

22. The non-transitory storage medium according to claim 21, wherein the method further comprises:

determining a situation parameter or at least one group of preference parameters of the electronic device and obtaining determined situation parameter or determined preference parameters; and generating the music playlist according to the determined situation parameter or the determined preference parameters, wherein the music playlist matches the determined situation parameter or the determined preference parameters.

23. The non-transitory storage medium according to claim 22, wherein the situation parameter is determined according to information that is selected from a group including information of movement speed, position information, time information, and/or environment information of the electronic device, the at least one group of preference parameters comprises parameters that are selected from a group including parameters of preferred song, parameters of preferred style, parameters of preferred rhythm, parameters of preferred target of sport, target time length of sport, target distance value of sport, and/or target value of consumed calories.

24. The non-transitory storage medium according to claim 22, wherein the method further comprises:

providing at least one group of situation parameters or at least one group of preference parameters for selecting.

25. The non-transitory storage medium according to claim 22, wherein the method further comprises:

querying audio files matching the determined situation parameter or querying audio files matching the determined preference parameters and obtaining queried audio files, by searching related information of the audio files stored in the storage device;

selecting a predetermined number of audio files from the queried audio files; and generating the music playlist according to the predetermined number of audio files.

26. The non-transitory storage medium according to claim 22, wherein the method further comprises:
   sending the determined situation parameter or the determined preference parameters to a server that is in electronic connection with the electronic device and sending a request to the server for obtaining the music playlist, wherein the music playlist matches the determined situation parameter or the determined preference parameters.

27. The non-transitory storage medium according to claim 22, wherein the method further comprises:
   storing the music playlist, the adjusted music playlist, the situation parameter or at least one group of preference parameters corresponding to the music playlist into the storage device.

28. The non-transitory storage medium according to claim 21, wherein the detecting of the at least one group of dynamic parameters comprises recording the at least one group of dynamic parameters when the electronic device begins to play audio files of the music playlist.

29. The non-transitory storage medium according to claim 21, wherein the method further comprises:
   searching a first audio file matching a physiological parameter of the user of the electronic device from the music playlist and obtaining a searched first audio file, when the physiological parameter of the user is detected;
   determining the searched first audio file to be played next;
   searching a second audio file matching the physiological parameter of the user from the electronic device or a server connected to the electronic device, when no audio file matching the physiological parameter of the user of the electronic device is found from the music playlist; and
   adding the second audio file into the music playlist.

30. The non-transitory storage medium according to claim 21, wherein the method further comprises:
   determining a remaining time length by comparing a movement parameter of the electronic device with a preset target value, when the movement parameter is detected;
   calculating a difference value of time length between total time length of all audio files of the music playlist that are not played and the remaining time length, if the total time length is less than the remaining time length;
   selecting one or more audio files matching the difference value of time length from the electronic device or a server connected to the electronic device; and
   adding the one or more selected audio files into the music playlist.

* * * * *